June 3, 1930.   R. H. PROSSER   1,761,584
RESILIENT CONNECTION FOR STRUCTURES
Filed May 3, 1928   3 Sheets-Sheet 1
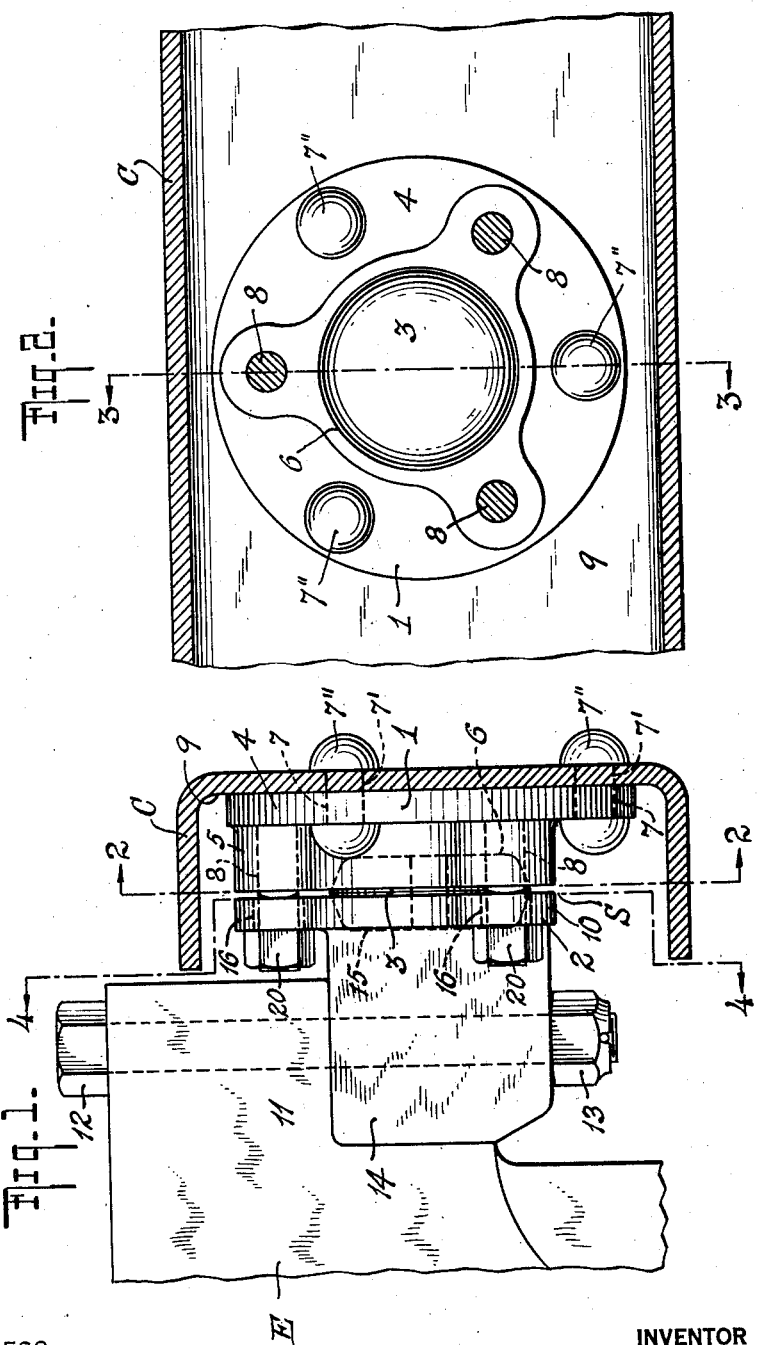
WITNESS
INVENTOR
ROBERT H. PROSSER
BY
ATTORNEYS

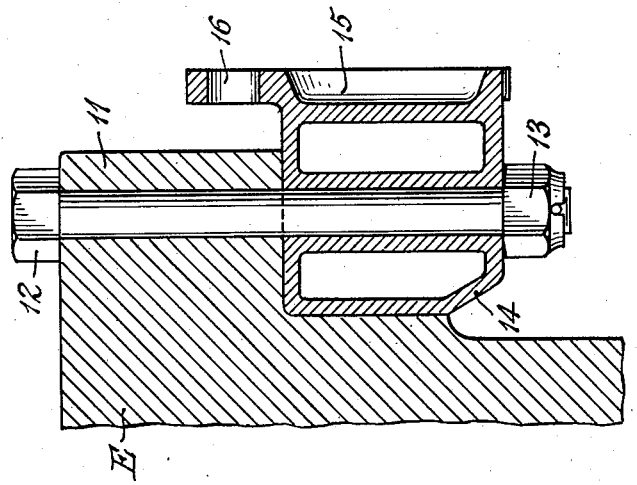
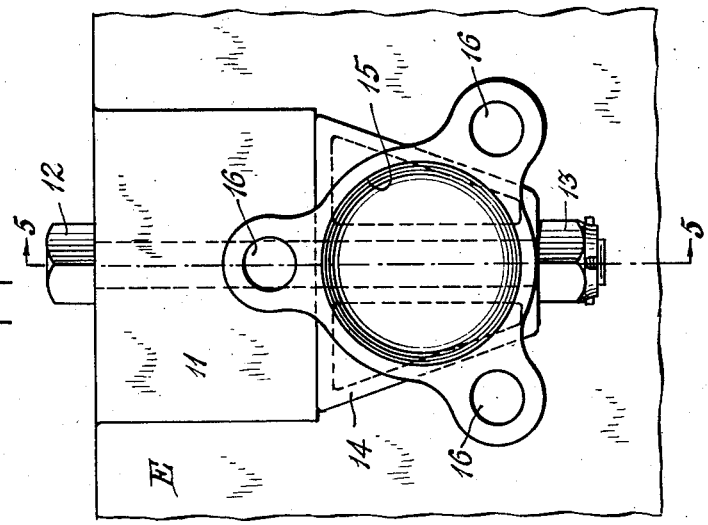
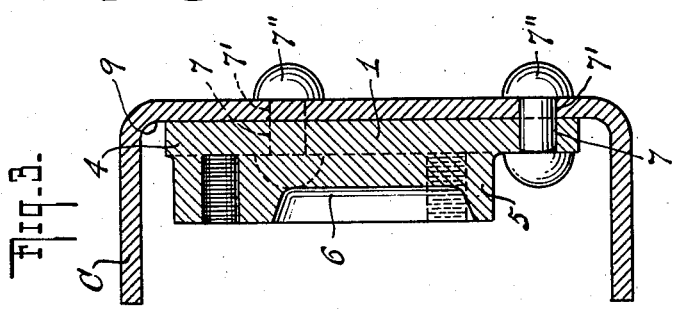

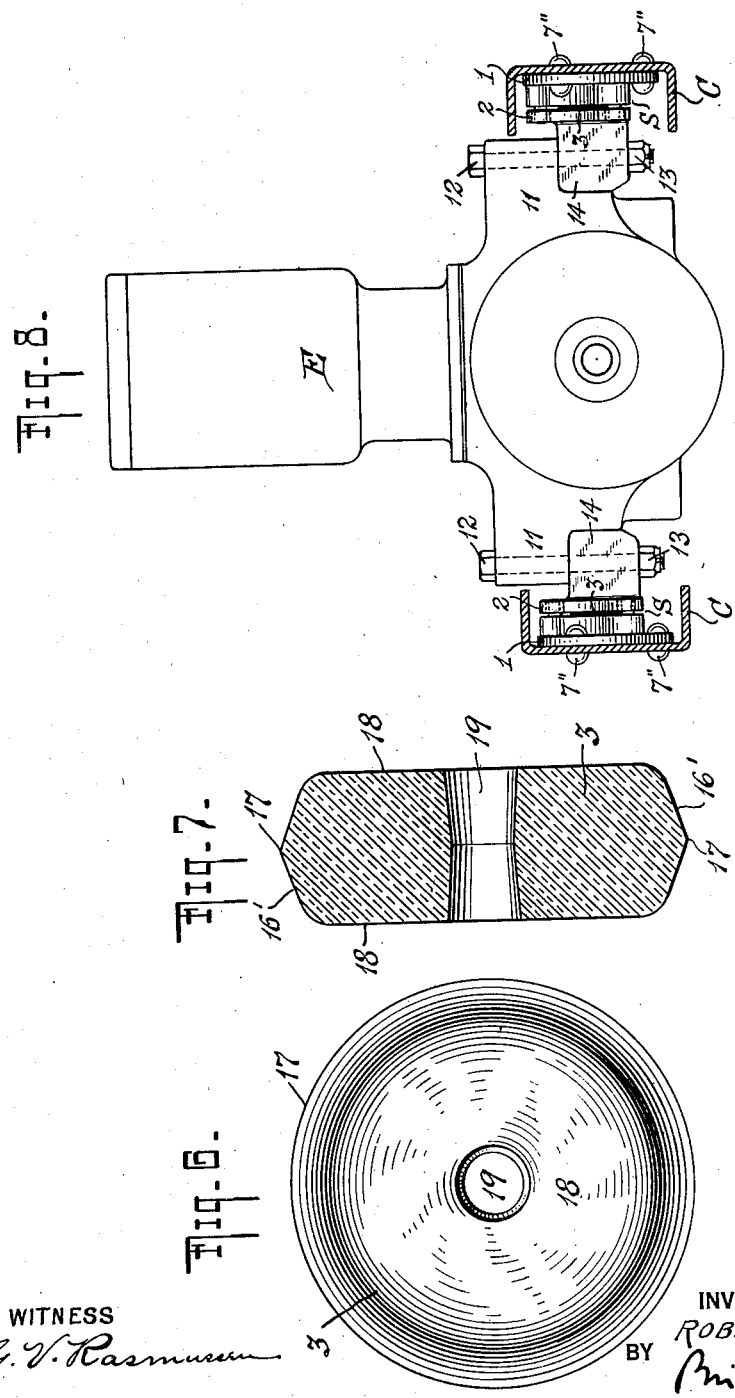

Patented June 3, 1930

1,761,584

UNITED STATES PATENT OFFICE

ROBERT H. PROSSER, OF OAKLAND, CALIFORNIA

RESILIENT CONNECTION FOR STRUCTURES

Application filed May 3, 1928. Serial No. 274,755.

This invention relates to resilient connections for structures, and more particularly to a resilient mounting for vehicles of various types and for parts thereof.

Heretofore various devices have been employed in the construction of automotive vehicles to insulate resiliently adjacent parts which are fixed and stationary with respect to each other but which have a relatively slight motion with respect to each other, as for example, the chassis and the body or the chassis and the radiator or engine. Practically all of the former commercial devices were based upon the principle of establishing a physical connection by bolts or the like between the connected parts, and then utilizing a resilient element as a cushion member subjected to compression only. In other words, the resilient member is placed upon the supporting part and the part constituting the load is mounted directly upon the resilient member so as to subject the latter to forces of compression. By mounting the parts in this manner, the resilient element is only capable, practically speaking, of absorbing shocks occurring in the direction of the physical connection and of only absorbing a portion of such shocks. This mode of mounting parts as is well known has its limitations and disadvantages of which the more important are that a substantial portion of the shock is transmitted through the structure instead of being absorbed, and that the shock-absorption ability of the resilient member is restricted to such shocks as put the member in compression.

I have discovered a novel mode of connecting parts of structures together, particularly parts of vehicles, which overcomes many of the disadvantages and limitations of prior devices and which provides a new principle of connecting, suspending, or mounting, based on shearing action wherein substantially complete cushioning is provided in practically every direction.

Generally speaking, my invention comprises interposing a structural organization between a supporting member and a supported member which has a resilient or elastic element so incorporated that the load stresses transmitted between the supporting and the supported members pass through the resilient element and subject the latter to shearing action. The resilient element is confined tightly within a chamber formed by the parts of the structural organization which are so constituted and oriented with respect to each other that the supported member floats free from the supporting member. In floating the parts have a restricted freedom of movement relative to each other and consequently are insulated effectively from each other. Under some circumstances it is preferable to incorporate means in my improved structural connection which will limit the movement of the parts and which will act as a coupling member to maintain the parts in their approximate positions and to prevent dislocation of the supported member in case of a failure of the resilient element. By incorporating my improved connection or mounting in structures, particularly of the type wherein parts are subjected to motion or to shock or to torque, the supported member is substantially insulated from the supporting member and the shocks, oscillations, vibrations, and the like are absorbed wholly or in part by the resilient element.

My invention may be embodied in various forms and may be applied to various structures but an illustrative embodiment of the invention dealing with the mounting of an internal combustion engine on a chassis is described. The construction and operation of the illustrative embodiment will be better understood from the following description taken in conjunction with the drawings, in which Fig. 1 is a fragmentary elevation partly in section, of a rear engine mounting; Fig. 2 shows a sectional view taken on the line 2—2 of Fig. 1; Fig. 3 shows a sectional view taken on the line 3—3 of Fig 2; Fig. 4 shows a sectional view taken on the line 4—4 of Fig. 1; Fig. 5 shows a sectional view taken on the line 5—5 of Fig. 4; Fig. 6 depicts a detail view of a rubber insert used in the structural connection illustrated in Fig. 1; Fig. 7 is a sectional view of Fig. 6; and Fig. 8 shows a rear elevation of an engine mounted with my improved structural connections.

Referring more particularly to Fig. 1, the reference character E designates a portion of an internal combustion engine which constitutes a supported member and the reference character C designates a side channel of a chassis which constitutes the supporting member. Of course, the chassis is mounted on front and rear axles which are supported by wheels as is well known. Between the chassis C and the side of engine E, I interpose my improved structural connection or mounting S which acts as an insulative mountaing and permits the engine to float and to have a certain freedom of motion.

The structural connection or mounting S consists essentially of a metallic frame member 1, a metallic hanger 2 and a resilient element 3 positioned between the frame member and the hanger for the purpose of uniting them together.

The frame member 1 is made preferably of cast steel and may have any suitable construction and configuration such as a cylindrical base 4 from which projects a raised portion 5 having a pocket or depression 6 incorporated therein. The base is secured in some appropriate manner to the channel C as by riveting through holes 7 provided in the base and corresponding holes 7' located in the channel with rivets 7''. By securing the base in this manner, the raised portion extends substantially horizontally from the channel and a plurality of studs 8, herein shown as three in number, fastened in the said raised portion, are practically normal to the inner wall 9 of the channel, although the studs may be fastened in any other appropriate angular position with respect to the inner wall.

Floating on studs 8 is raised portion 10 of the cast steel hanger 2 which is bolted to lug 11 of the engine by bolt 12 and nut 13 via cantilever seat 14 of the hanger. The raised portion 10 has a shape similar to raised portion 5 and has a pocket or depression 15 which mates with pocket 6 when the studs extend through holes 16 of the hanger. With this arrangement of parts the pockets 6 and 15 form a confining chamber for the resilient element 3 which fits firmly and snugly in the pockets so that there is no play between the pocket and the resilient element and practically no surface friction between the surface of the pocket and the surface of the resilient element.

The resilient element 3 may be constituted of any approved elastic material such as rubber or the like and is made of such form and proportions as to be strong enough to withstand the lateral wedging action it receives from the frame member and the hanger and to absorb the shearing action resulting from movements of the chassis and the engine. A form of element which I have found to be satisfactory is illustrated in Fig. 6 and is made preferably of a composition containing approximately 12% rubber. This composition is mixed and cured in a manner sometimes known to the trade as a straight-line cure to produce a long-lived resilient element which is capable of resisting shearing stresses of about 2500 pounds per square inch. This form is disk-like in character and has inclined edges 16' sloping from a central portion or ridge 17 to faces 18. Any suitable slope may be employed but I prefer to employ an angle of about 20°. A configuration of this type facilitates the seating of the resilient element in the pockets and adapts the element to take up the wedging action. In the center of the disk-like element I provide a hole 19 herein depicted as cylindrical although any other form may be employed. When the resilient element is in place in the structural connection and is under stress, the hole 19 affords a space wherein the material constituting the element can flow. Of course, the disk can also flow in the space situated between the face of raised portion 5 of the frame member and the face of the raised portion 10 of the hanger. It will be apparent from the foregoing that the rubber disk and the pockets of the structural connection are organized so that the stresses and movements are forced through the rubber disk without surface friction on the rubber disk.

The installation of my improved structural connection is obvious to one skilled in the art. The frame member 1 is secured to the inner face of the channel by means of rivets 7'' or some equivalent means (see Fig. 3). After the frame member is firmly secured in place, the resilient element 3 is placed in pocket 6 of the frame and is held in position during the installation by the use of a temporary adhesive. Studs 8 can be screwed into the holes located in the raised portion 5. The hanger 2 can now be put on studs 8 via holes 16 and can be fastened securely thereto by means of nuts 20. When the nuts are drawn up home into their final position, the resilient element 3 is held snugly and tightly in the chamber formed by the mating pockets 6 and 15 of the frame member and hanger, respectively, so that there is no possibility of play or surface friction between contacting surfaces. Of course, one of my connections or mountings is also secured on the channel on the left side of the chassis (see Fig. 8). When the two rear structural connections S have been positioned and the mounting for the front of the engine has been prepared, the engine E is placed upon the front mounting (not shown) and upon the cantilever seats 14 of the hangers of the rear side connections. A bolt 12 and nut 13 are then used to hold lug 11 of the engine to seat 14 so as to firmly secure the engine in position. After the mounting of the engine has been completed, nuts 20 are removed from studs 8 or the front end of the studs with nuts 20 are driven off with a chisel or the like. In some instances where it is difficult to take the uppermost nut off, it is merely cut off with a chisel or the like as one skilled in the art will readily understand. The remaining portion of the stud or the free end thereof projects through holes 16 and remains free from the inner surfaces thereof (see Fig. 1). The engine is now wedged inside of the chassis and is supported securely in a floating position by the resilient element confined in the pockets of each of the two structural connections.

The portions of the projecting studs act as a limit to movements of the floating engine and associated hanger and constitute safety elements for supporting the engine in case the resilient element happens to fail.

In Fig. 8 a rear elevation of an engine, which is supported by my improved resilient structural connections, is shown. The internal combustion engine E, which is to be maintained substantially free from shocks and stresses, is located between the side channels C of the chassis of the automotive vehicle which is subjected to shocks and stresses, and the said engine is supported in a floating position by my improved resilient structural connection S which is interposed between each side channel and the side of the engine. The structural connection S as described hereinabove has its frame member securely fastened to a channel and has its hanger rigidly united to the rear side portion of the engine. The frame member and the hanger are separate from each other and have cup-like pockets mating with each other to form a split confining chamber for a resilient element which constitutes an elastic coupling means between the engine and the chassis. The resilient element has such form and proportions as to fit snugly in the cup-like pockets and to resist and to absorb the stresses wholly or in part through the agency of shearing action. By the use of the aforesaid organization in which the resilient element supports its load by being placed mainly in shear, I am able to mount an engine in an insulated or floating position so that the engine will be practically free from the shocks and stresses to which the chassis of the vehicle is subjected. Conversely, the use of my improved connection prevents the vibrations and oscillations of the engine from being transmitted to the chassis and wheels of the vehicle and thus to the roadway or other supporting surface and then to the surrounding environment and structures. At the present time automotive vehicles have parts thereof shaken loose due to the engine vibrations. This causes deterioration of the equipment, shortens the life of the vehicle, and necessitates high maintenance charges. In closed cars, such as sedans, limousines, coupés, and motor buses, noises and hums are produced by the direct and indirect vibrations of the engine or by the running of the tires on the roads in such a manner that the intensity and character of the sound makes it uncomfortable or even unbearable to remain inside of the car. When an automotive engine is mounted on my improved structural connections the car is so free from vibrations that objects, like pencils, may be balanced on some part of the car without being overthrown or overturned. Moreover, the torque and the backward and forward movement developed in starting and stopping the car are absorbed in and dissipated by my connection. The installation of my improved structural connection thus effects a substantial saving in operating and maintenance costs, increases the life of the vehicle, makes riding in closed cars comfortable, and prevents the vibration of roadways, streets, and neighboring buildings bordering streets and roads.

Although my invention is herein exemplified as a structural connection for mounting the rear side of an internal combustion engine in a chassis, it may also be employed to provide a practically perfect insulation between four points on the engine and four adjacent points on the chassis or between the axle and the spring connection thereto or between the spring and the chassis or between the chassis frame and the radiator or motor or cab or in fact any part of the vehicular equipment carried directly or indirectly on the chassis or axles.

It is to be observed that my invention provides a structural connection having a resilient element incorporated therein for use between parts of structures, particularly vehicles such as automotilve vehicles, railways, airplanes, or the like, or parts thereof, or various types of machinery, which element is so constructed and so positioned that the resilient element is subjected to shearing action and is capable of absorbing wholly or in part the forward, backward, up, down and sidewise motions of the connected parts.

I claim:

1. In a structure exposed to vibrations, the combination comprising a supporting element, a supported element maintained in resiliently spaced relation to said supporting element by means hereinafter described, said supporting and supported elements being so positioned relatively to each other that neither is rotatable with respect to the other, one or more pockets associated with each element having core-engaging faces, said pockets being opposed to each other to form a split confining chamber, and a resilient core positioned in said confining chamber and seated snugly against the core-engaging faces, said core being thicker than the combined depth of the two pockets and being operative as a coupling agent adapted to absorb relative movements between the two elements by being placed principally under shearing stresses.

2. A resilient structural mounting comprising a frame member having at least one pocket incorporated therein and being adapted to be secured to a suporting member, a hanger provided with a mating pocket opposed to every pocket in said frame member and with means for holding a supported member, a physical connection for temporarily uniting said frame member to said hanger during the installation of the structural mounting, said frame and said hanger being so positioned relatively to each other that neither is rotatable with respect to the other, and a resilient element seated snugly in every pair of opposed pockets to maintain the frame member and the hanger in spaced relation and to act as a resilient permanent coupling agent between said frame member and said hanger by being placed principally under shearing stresses after the installation of the mountaing and the removal of the aforesaid temporary physical connection.

3. A resilient structural mounting comprising a frame member having a fastening base and a raised portion containing at least one pocket, said fastening base being adapted to be secured to a supporting member, a hanger having a cantilever seat for holding a supported member and a raised portion mating with the first mentioned raised portion and containing a mating pocket opposed to every pocket in the frame member, a physical connection for temporarily uniting said frame member to said hanger during the installation of the structural mounting, and a resilient element positioned in every pair of opposed mating pockets to maintain the frame member and hanger in spaced relation and to make a tight shearing joint for coupling the frame member to the hanger in a permanent and resilient manner after the installation of the mounting and the removal of the said temporary physical connection.

4. A resilient structural connection comprising a frame member having a flat disklike base with a plurality of holes therein for fastening to a supporting member and a raiser portion projecting from said base and containing a cup-like pocket with inwardly sloping sides, a hangar having a cantilever seat associated therewith for supporting and securing a member and a raised portion projecting laterally from said seat and containing a cup-like pocket with inwardly sloping sides, said pocket mating with the first-named pocket to form a split confining chamber, a disk-like resilient element shaped to fit tightly into said pockets and to maintain the frame member and the hanger in spaced relation from each other and adapted to resiliently couple said frame member to said hanger by means subjected to a lateral wedging action and to a shearing action, and means rigidly associated with the raised portion of the frame member and cooperating with the raised portion of the hanger to normally permit the hanger to be free to float within a restricted range of movement and to act as a limit when there is any tendency to exceed said range.

5. In a vehicle the combination comprising a supporting member which is subjected to vibrations, shocks and stresses, a supported member which is to be maintained substantially free from shocks and stresses, said supporting and supported members being so positioned relatively to each other that neither is rotatable with respect to the other, a structural connection having a part rigidly secured to said supporting member and terminating in a cup-like pocket having inwardly sloping sides, another part independent of said first part fastened rigidly to said supported member, and a resilient element mounted snugly in the mating pockets to resiliently couple the parts together and to maintain the supported member in a spaced floating position through the agency of shearing action, said resilient element being thicker than the combined depth of the two mating pockets and being maintained in its aforesaid position under compression crosswise of the said depth of the two mating pockets.

6. In a motor vehicle the combination comprising a chassis having side channels, an internal combustion engine located between said channels, and a resilient structural connection interposed between each side channel and a portion of the engine and consisting of a frame member securely fastened to the said channel and having a cup-like pocket provided on a lateral face thereof to open inwardly toward the rear of the engine, a hanger rigidly united to a portion of the said engine and having a pocket facing and mating with the said first pocket, and a resilient element fitting snugly in said pockets and constituting an elastic coupling means between the engine and a channel of the chassis which is adapted to resist and to absorb the stresses wholly or in part by shearing action.

7. In a structure exposed to vibrations, the combination comprising a supporting element, a supported element maintained in resiliently spaced relation to said supporting element by means hereinafter described, said supporting and supported elements being so positioned relatively to each other that neither is rotatable with respect to the other, one or more pockets associated with each element having core-engaging faces, said pockets being opposed to each other to form a split confining chamber, a resilient core positioned in said confining chamber and seated snugly against the core-engaging faces, said core being thicker than the combined depth of the two pockets and being operative as a coupling agent adapted to absorb relative movement between the two elements by being placed principally under shearing stresses, and means for maintaining the resilient element under substantially constant compression cross-wise of the resilient core-coupling agent.

8. In a vehicle the combination comprising a supporting member which is subjected to vibrations, shocks, and stresses, a supported member which is to be maintained substantially free from shocks and stresses, said supporting and supported members being so positioned relatively to each other that neither is rotatable with respect to the other, and a structural connection having a part rigidly secured to said supporting member, another part independent of said first part fastened rigidly to said supported member, a resilient element mounted between said parts to resiliently couple the parts together and to maintain the supported member in a spaced floating position through the agency of shearing action, and means for maintaining the resilient element under substantially constant compression cross-wise of the coupling.

In testimony whereof I have hereunto set my hand.

ROBERT H. PROSSER.